US012597869B2

(12) United States Patent
Aeloiza et al.

(10) Patent No.: US 12,597,869 B2
(45) Date of Patent: Apr. 7, 2026

(54) AUTOMATIC BOOSTING CURRENT ADJUSTMENT FOR ZERO VOLTAGE SWITCHING IN AUXILIARY RESONANT COMMUTATED POLE INVERTER

(71) Applicant: ABB Schweiz AG, Baden (CH)

(72) Inventors: Eddy C. Aeloiza, Apex, NC (US);
Goran Mandic, Wake Forest, NC (US);
Weiqiang Chen, Cary, NC (US)

(73) Assignee: ABB Schweiz AG, Baden (CH)

(*) Notice: Subject to any disclaimer, the term of this patent is extended or adjusted under 35 U.S.C. 154(b) by 297 days.

(21) Appl. No.: 18/483,088

(22) Filed: Oct. 9, 2023

(65) Prior Publication Data

US 2025/0119069 A1 Apr. 10, 2025

(51) Int. Cl.
| | |
|---|---|
| *H02M 7/5387* | (2007.01) |
| *H02M 1/00* | (2007.01) |
| *H02M 1/08* | (2006.01) |
| *H02M 7/5395* | (2006.01) |

(52) U.S. Cl.
CPC ..... *H02M 7/53873* (2013.01); *H02M 1/0058* (2021.05); *H02M 1/083* (2013.01); *H02M 7/5395* (2013.01)

(58) Field of Classification Search
CPC .......... H02M 7/5395; H02M 7/53873; H02M 7/4815; H02M 7/487; H02M 1/0058; H02M 1/083; H02M 1/342; Y02B 70/10
See application file for complete search history.

(56) References Cited

U.S. PATENT DOCUMENTS

| | | | | |
|---|---|---|---|---|
| 6,327,286 | B1 * | 12/2001 | Ness | H01S 3/038 |
| | | | | 372/38.1 |
| 10,367,413 | B2 * | 7/2019 | Hamond | H02M 3/158 |
| 11,469,684 | B2 | 10/2022 | Shi et al. | |
| 12,255,552 | B2 * | 3/2025 | Aeloiza | H02M 1/0054 |

(Continued)

FOREIGN PATENT DOCUMENTS

| | | | | |
|---|---|---|---|---|
| CN | 110572065 | B * | 1/2021 | H02M 7/483 |
| CN | 112398359 | A | 2/2021 | |

OTHER PUBLICATIONS

Batzel, T. D., & Adams, K. (Jun. 2012). Variable timing control for ARCP voltage source inverters operating at low DC voltage. In 2012 IEEE Transportation Electrification Conference and EXPO (ITEC) (pp. 1-8). IEEE. (Year: 2012).*

(Continued)

*Primary Examiner* — Thienvu V Tran
*Assistant Examiner* — Yahveh Comas Torres
(74) *Attorney, Agent, or Firm* — Fitch Even Tabin & Flannery LLP

(57) ABSTRACT

The present disclosure provides a method, control circuit, and non-transitory computer-readable medium for adjusting a boosting current of an auxiliary resonant commutated pole inverter (ARCPI). The method includes: (1) providing an input to trigger a first counter; (2) triggering a second counter based on determining that the first counter reaches a boosting time of the ARCPI; (3) stopping the second counter based on determining that a detection signal is received, and obtaining a time interval counted by the second counter; and (4) adjusting the boosting current based on determining that the time interval is equal to a sum of a first time and a blanking time.

20 Claims, 7 Drawing Sheets

400

(56) References Cited

U.S. PATENT DOCUMENTS

| | | | | |
|---|---|---|---|---|
| 2010/0246231 | A1* | 9/2010 | Sirio | H02M 3/1588 |
| | | | | 363/132 |
| 2017/0179814 | A1 | 6/2017 | Hamond et al. | |
| 2019/0348911 | A1 | 11/2019 | Hamond et al. | |
| 2023/0238897 | A1* | 7/2023 | Nakahara | H02P 29/20 |
| | | | | 318/504 |
| 2024/0429833 | A1* | 12/2024 | Viitanen | H02M 7/487 |
| 2025/0096700 | A1* | 3/2025 | Amini | H02M 1/44 |

OTHER PUBLICATIONS

Machine Translation CN-110572065-B (Year: 2021).*
Saha, T., Mukherjee, S., Galigekere, V. P., & Onar, O. C. (Oct. 2020). Design of auxiliary circuit elements for achieving zero voltage switching in a wireless power transfer system. In 2020 IEEE Energy Conversion Congress and Exposition (ECCE) (pp. 5537-5544). IEEE. (Year: 2020).*
Steyn, K., & Beukes, J. (Sep. 2022). Adaptive Resonant-Valley Switching for a GaN HEMT Direct AC-AC Auxiliary Resonant Commutated Pole Converter. In 2022 24th European Conference on Power Electronics and Applications (EPE'22 ECCE Europe) (pp. P-1). IEEE. (Year: 2022).*
Zocher, M., Grass, N., & Kennel, R. (Mar. 2022). Auxiliary resonant commutated pole inverter (ARCPI) operation using online voltage measurements. In 2022 IEEE Applied Power Electronics Conference and Exposition (APEC) (pp. 1592-1597). IEEE. (Year: 2022).*
Kollensperger et al., "Design of a Flexible Control Platform for Soft-Switching Multi-Level Inverters," 36th Power Electronics Specialists Conference, IEEE, 915-921 (Jun. 12, 2005).
Steyn et al., "Adaptive Resonant-Valley Switching for a GaN HEMT Direct AC-AC Auxiliary Resonant Commutated Pole Converter," 24th European Conference on Power Electronics and Applications (EPE'22 ECCE Europe), 8 pp. (Sep. 5, 2022).
Zocher et al., "Auxiliary Resonant Commutated Pole Inverter (ARCPI) Operation Using Online Voltage Measurements," 2022 IEEE Applied Power Electronics Conference and Exposition (APEC), 1592-1597 (Mar. 20, 2022).

European Patent Office, Extended European Search Report in European Patent Application No. 24205308.0, 10 pp. (Nov. 27, 2024).
Dawidziuk et al., "An Analysis and Experimental Studies of Auxiliary Resonant Commutated Pole Inverters," ISIE'93—Budapest: IEEE International Symposium on Industrial Electronics Conference Proceedings, 780-785 (Jun. 1-3, 1993).
Dong, "Analysis and Evaluation of Soft-switching Inverter Techniques in Electric Vehicle Applications," dissertation, Virginia Polytechnic Inst. and State Univ., 259 pp. (Apr. 22, 2003).
Pickert et al., "DSP controlled auxiliary resonant commutated pole inverter without switch status sensors," 1998 Seventh International Conference on Power Electronics and Variable Speed Drives (IEE Conf. Publ. No. 456), 650-655 (Sep. 21-23, 1998).
Saha et al., "Design of Auxiliary Circuit Elements for Achieving Zero Voltage Switching in a Wireless Power Transfer System," 2020 IEEE Energy Conversion Congress and Exposition (ECCE), 8 pp. (Oct. 11-15, 2020).
Soltau et al., "Ensuring Soft-Switching Operation of a Three-Phase Dual-Active Bridge DC-DC Converter Applying an Auxiliary Resonant-Commutated Pole," 2014 16th European Conference on Power Electronics and Applications (EPE), 10 pp. (Aug. 26-28, 2014).
Voss et al., "Control Techniques of the Auxiliary-Resonant Commutated Pole with Special Regards on the Dual-Active Bridge DC-DC Converter," CPSS Transactions on Power Electronics and Applications, 3(4): 352-361 (Dec. 2018).
Voss, "Multi-Megawatt Three-Phase Dual-Active Bridge DC-DC Converter: Extending Soft-Switching Operating Range with Auxiliary-Resonant Commutated Poles and Compensating Transformer Saturation Effects," dissertation, RWTH Aachen University, 199 pp. (Sep. 9, 2019).
Yu et al., "State Plane Analysis of An Auxiliary Resonant Commutated Pole Inverter and Implementation With Load Current Adaptive Fixed Timing Control," IEEE 2002 28th Annual Conference of the Industrial Electronics Society (IECON 02), 1: 437-443 (Nov. 5-8, 2002).

* cited by examiner

600

700 bus 706 communication interface
704 display
710 processor
702 memory
708

AUTOMATIC BOOSTING CURRENT ADJUSTMENT FOR ZERO VOLTAGE SWITCHING IN AUXILIARY RESONANT COMMUTATED POLE INVERTER

FIELD

Generally, the present disclosure relates to zero voltage switching (ZVS) in an auxiliary resonant commutated pole inverter (ARCPI) and, more specifically, to a method and device for accurate ZVS in an ARCPI.

BACKGROUND

A pulse width modulation (PWM) auxiliary resonant commutated pole inverter (ARCPI) is often used to achieve soft switching. A PWM ARCPI utilizes auxiliary devices and enables zero voltage switching (ZVS) in each commutation instant. Accordingly, a PWM ARCPI provides advantages of more efficient operation at higher switching frequencies and ease of control as compared to inverters without ZVS. In order to ensure ZVS and to reduce switching loss, the auxiliary devices of the PWM ARCPI are tasked with boosting a precise amount of current prior to every commutation instant. A boosting current for the PWM ARCPI is expected to reach a sufficient level to guarantee a proper ZVS operation of the PWM ARCPI through adjustments. Such adjustments are often done manually at commissioning of the PWM ARCPI. However, results of these adjustments are easily affected by various factors such as temperature dependencies and aging of semiconductor devices and capacitors, etc.

Therefore, there is a need to create an automated system that provides boosting current adjustments for a PWM ARCPI under any operating conditions to ensure ZVS and switching loss reduction.

SUMMARY

In an exemplary embodiment, the present disclosure provides a method for an auxiliary device of an auxiliary resonant commutated pole inverter (ARCPI) to adjust a boosting current of the ARCPI. The auxiliary device is connected with a resonant inductor. The method includes:

(1) providing an input to trigger a first counter; (2) triggering a second counter based on determining that the first counter reaches a boosting time of the ARCPI; (3) stopping the second counter based on determining that a detection signal is received, and obtaining a time interval counted by the second counter; and (4) adjusting the boosting current based on determining that the time interval is equal to a sum of a first time and a blanking time.

The adjusting the boosting current includes increasing the first time by a first time value and repeating the steps (1)-(4) until the time interval is less than the sum of the first time and the blanking time based on determining that the first time is less than a maximal time; determining whether the boosting current is less than a maximal boosting current based on determining that the first time is larger than or equal to the maximal time; and increasing the boosting current by a boosting current value and repeating the steps (1)-(4) until the time interval is less than the sum of the first time and the blanking time in response to the boosting current being less than the maximal boosting current.

The method further includes indicating "search failure" in response to the boosting current being larger than or equal to the maximal boosting current.

The method further includes indicating the boosting current is set based on determining that the time interval is less than the sum of the first time and the blanking time.

The boosting time is calculated as follows:

$$T_{bst} = \frac{(I_o + I_{bst}) \cdot 2 \cdot L_r}{V_{DC}}$$

where $V_{DC}$ represents a direct current (DC) bus voltage, $L_r$ represents resonance inductance of a resonant inductor of the ARCPI, $I_o$ represents a present output current at a commutation moment of the ARCPI, and $I_{bst}$ represents the boosting current corresponding to the boosting time of the ARCPI.

The detection signal is determined through a detection circuit for a main switch of the ARCPI.

The input is a pulse width modulation (PWM).

The first counter is the same as the second counter, or the first counter is different from the second counter.

In another exemplary embodiment, the present disclosure provides a control circuit for an auxiliary device of an auxiliary resonant commutated pole inverter (ARCPI) for adjusting a boosting current of the ARCPI. The auxiliary device is connected with a resonant inductor. The control circuit includes one or more processors configured to:

(1) provide an input to trigger a first counter; (2) trigger a second counter based on determining that the first counter reaches a boosting time of the ARCPI; (3) stop the second counter based on determining that a detection signal is received, and obtaining a time interval counted by the second counter; and (4) adjust the boosting current based on determining that the time interval is equal to a sum of a first time and a blanking time.

The one or more processors are further configured to increase the first time by a first time value and repeating the steps (1)-(4) until the time interval is less than the sum of the first time and the blanking time based on determining that the first time is less than a maximal time; determine whether the boosting current is less than a maximal boosting current based on determining that the first time is larger than or equal to the maximal time; and increase the boosting current by a boosting current value and repeating the steps (1)-(4) until the time interval is less than the sum of the first time and the blanking time in response to the boosting current being less than the maximal boosting current.

The one or more processors are further configured to indicate "search failure" in response to the boosting current being larger than or equal to the maximal boosting current.

The one or more processors are further configured to indicate the boosting current is set based on determining that the time interval is less than the sum of the first time and the blanking time.

The boosting time is calculated as follows:

$$T_{bst} = \frac{(I_o + I_{bst}) \cdot 2 \cdot L_r}{V_{DC}}$$

where $V_{DC}$ represents a direct current (DC) bus voltage, $L_r$ represents resonance inductance of a resonant inductor of the ARCPI, $I_o$ represents a present output current at a commutation moment of the ARCPI, and $I_{bst}$ represents the boosting current corresponding to the boosting time of the ARCPI.

The detection signal is determined through a detection circuit for a main switch of the ARCPI.

The input is a pulse width modulation (PWM).

The first counter is the same as the second counter, or the first counter is different from the second counter.

In another exemplary embodiment, the present disclosure provides a non-transitory computer-readable medium, having computer-executable instructions stored thereon, the computer-executable instructions, when executed by one or more processors of a control circuit for an auxiliary device of an auxiliary resonant commutated pole inverter (ARCPI) for adjusting a boosting current of the ARCPI, cause the control circuit to facilitate the following steps. The auxiliary device is connected with a resonant inductor.

(1) providing an input to trigger a first counter; (2) triggering a second counter based on determining that the first counter reaches a boosting time of the ARCPI; (3) stopping the second counter based on determining that a detection signal is received, and obtaining a time interval counted by the second counter; and (4) adjusting the boosting current based on determining that the time interval is equal to a sum of a first time and a blanking time.

The control circuit is further caused to increase the first time by a first time value and repeating the steps (1)-(4) until the time interval is less than the sum of the first time and the blanking time based on determining that the first time is less than a maximal time; determine whether the boosting current is less than a maximal boosting current based on determining that the first time is larger than or equal to the maximal time; and increase the boosting current by a boosting current value and repeating the steps (1)-(4) until the time interval is less than the sum of the first time and the blanking time in response to the boosting current being less than the maximal boosting current.

The control circuit is further caused to indicate "search failure" in response to the boosting current being larger than or equal to the maximal boosting current.

The control circuit is further caused to indicate the boosting current is set based on determining that the time interval is less than the sum of the first time and the blanking time.

BRIEF DESCRIPTION OF THE DRAWING(S)

Figure 3:
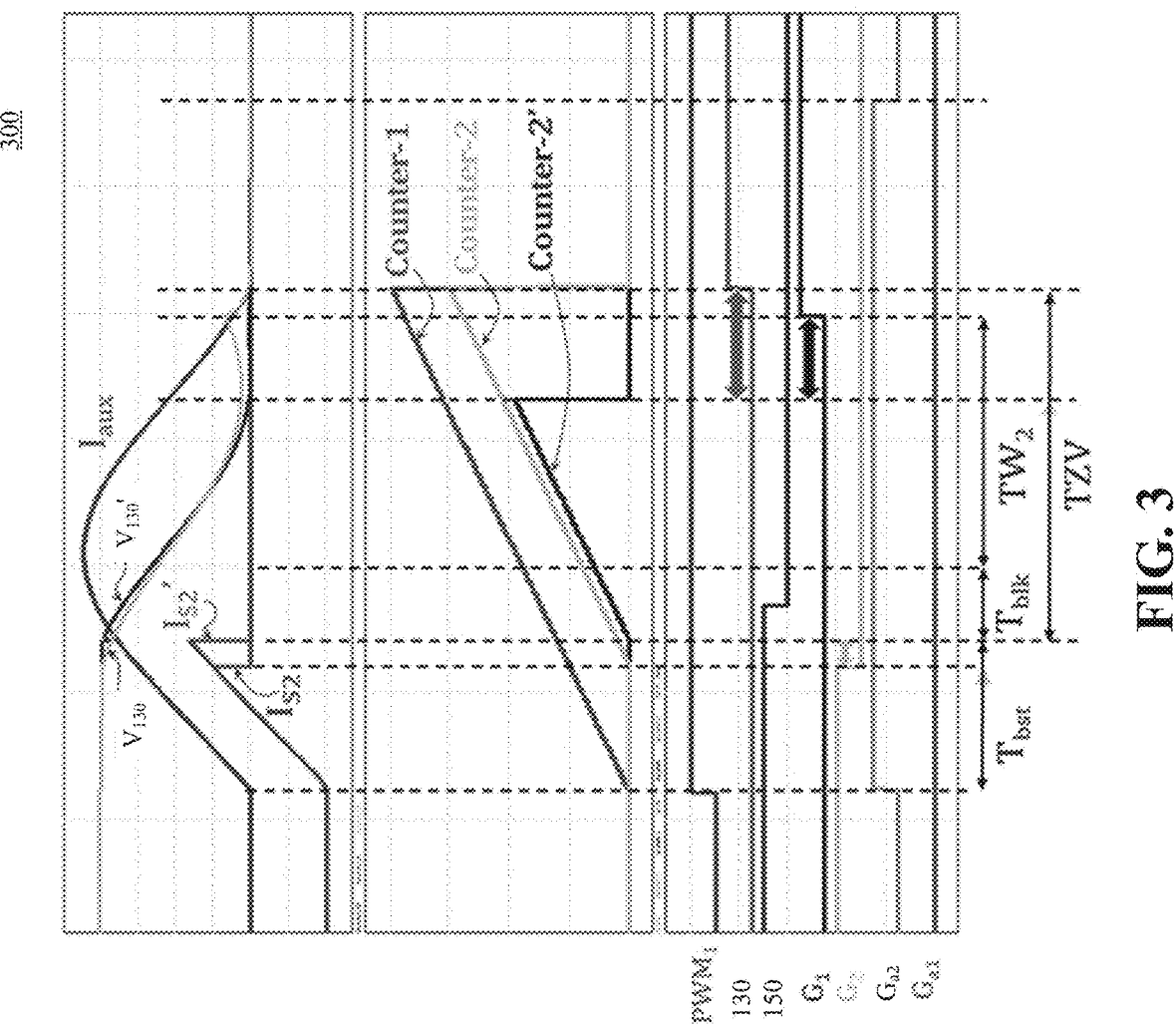
Figure 4:
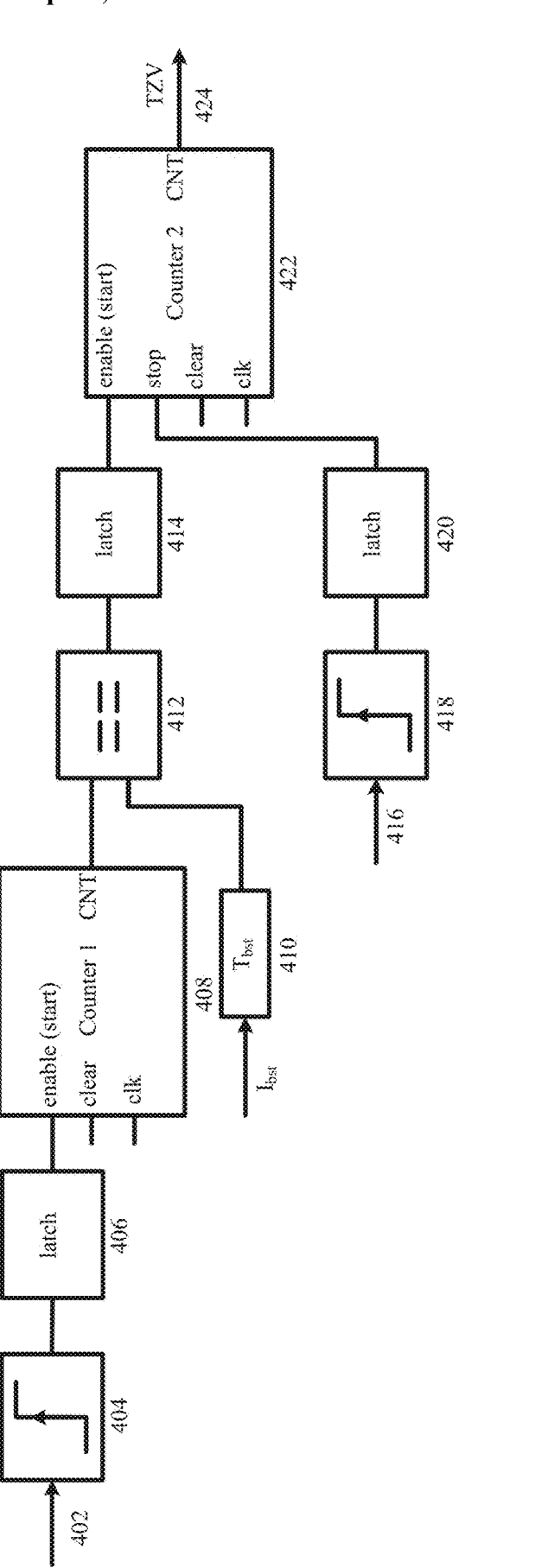
Figure 5:
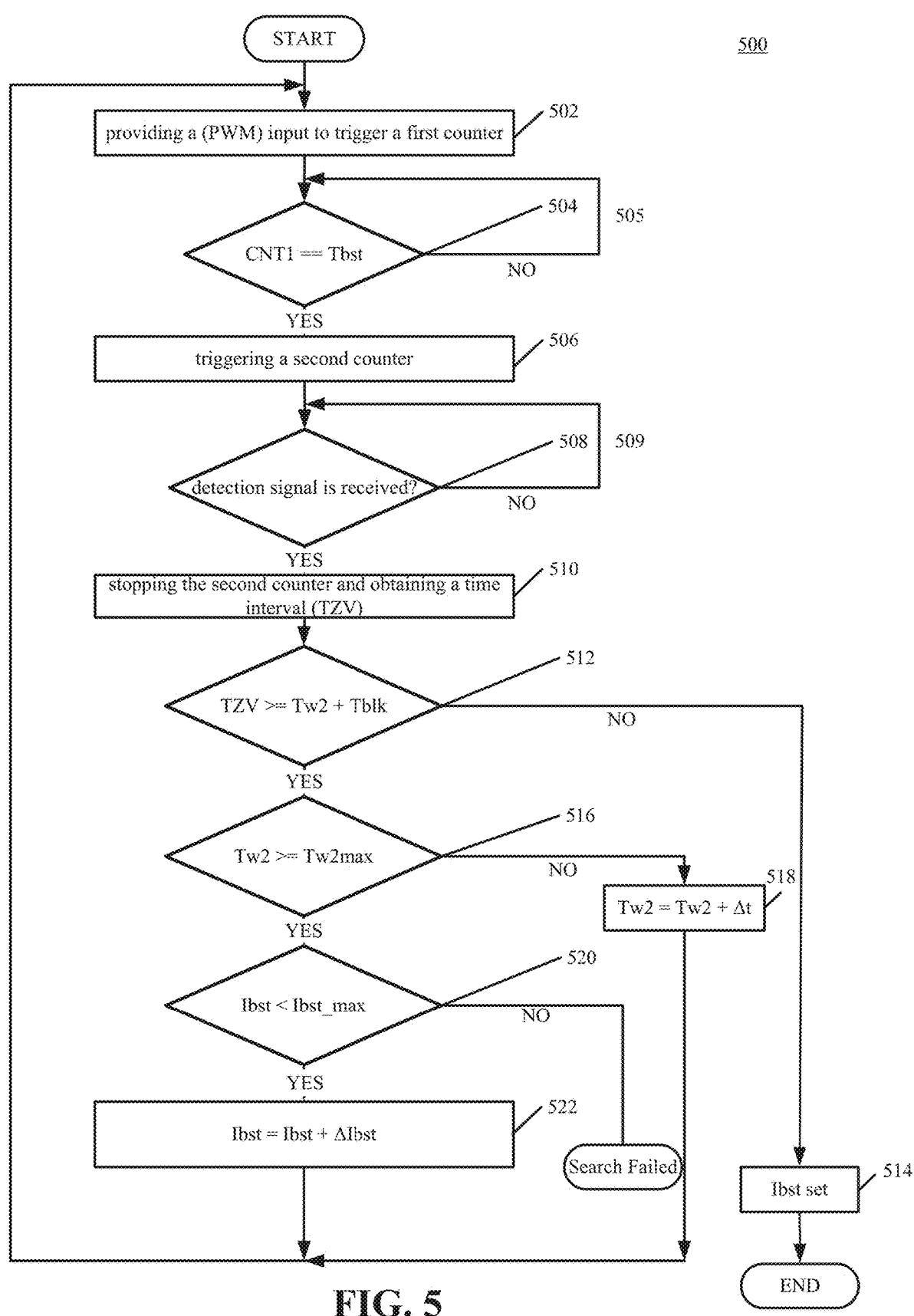
Figure 6:
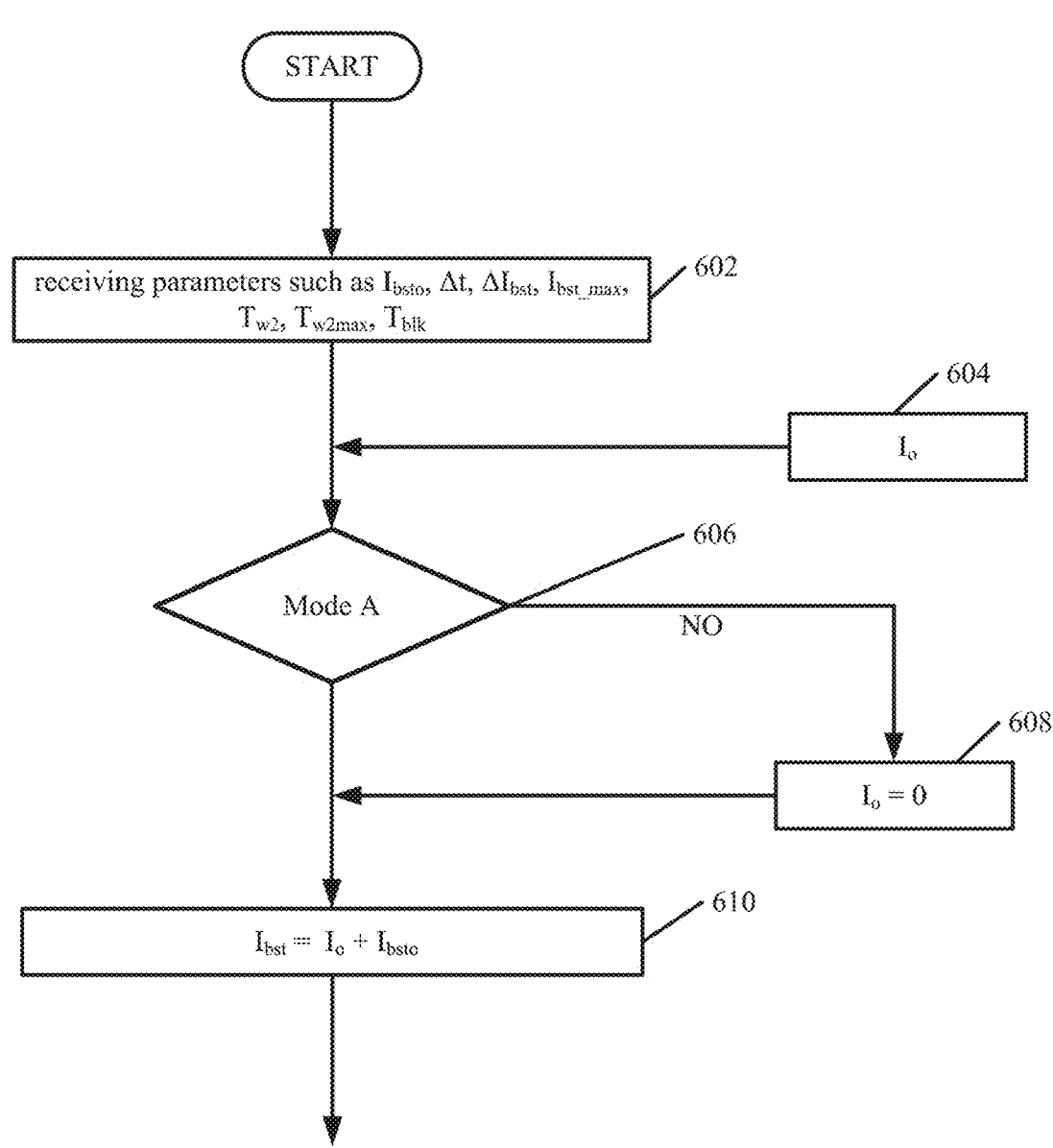
Figure 7:

FIG. 3 includes schematic plots of relevant parameters during Mode A of a one-phase ARCPI equivalent circuit according to an exemplary embodiment of the present disclosure;

FIG. 4 is a schematic diagram of zero voltage switching (ZVS) timing measurement process for a one-phase ARCPI equivalent circuit according to an exemplary embodiment of the present disclosure;

FIG. 5 is a schematic flowchart of an automatic boosting current adjustment process for a one-phase ARCPI equivalent circuit according to an exemplary embodiment of the present disclosure;

FIG. 6 is a schematic flowchart of automatic boosting current adjustment process for a one-phase ARCPI equivalent circuit according to an exemplary embodiment of the present disclosure; and FIG. 7 is a schematic diagram of a device for automatically adjusting a boosting current of a one-phase ARCPI equivalent circuit according to an exemplary embodiment of the present disclosure.

DETAILED DESCRIPTION

Exemplary embodiments of the present disclosure provide a method for an auxiliary device of an auxiliary resonant commutated pole inverter (ARCPI) to adjust a boosting current of the ARCPI. The auxiliary device is connected with an auxiliary switch path that includes a resonant inductor ($L_r$). The method provides zero voltage switching (ZVS) and switching loss reduction by adjusting boosting current levels in the auxiliary switch path of the ARCPI.

The boosting current of the ARCPI is controlled by determining an amount of time that the voltage is applied to a known inductance, for example, the resonant inductor ($L_r$) in the auxiliary switch path of the ARCPI. If the boosting current is insufficient, a switch between the main switches of the ARCPI does not occur, resulting in high switching voltage losses, that is, no ZVS. Thus, it becomes essential to adjust the boosting current to a sufficient level to ensure proper ZVS operation of the ARCPI.

The adjustment of the boosting current is done manually at the commission of the ARCPI according to the conventional practice. However, such adjustment is easily affected by temperature dependencies and aging of semiconductor devices and capacitors, etc. The result is less satisfying. It is desirable to have an automated system that adjusts boosting current for the ARCPI under all operating conditions.

Exemplary embodiments of the present disclosure provide an algorithm for an automated system, through which the boosting current is adjusted to a proper value that guarantees ZVS operation of the ARCPI and switching loss reduction under all operation conditions.

Figure 1:
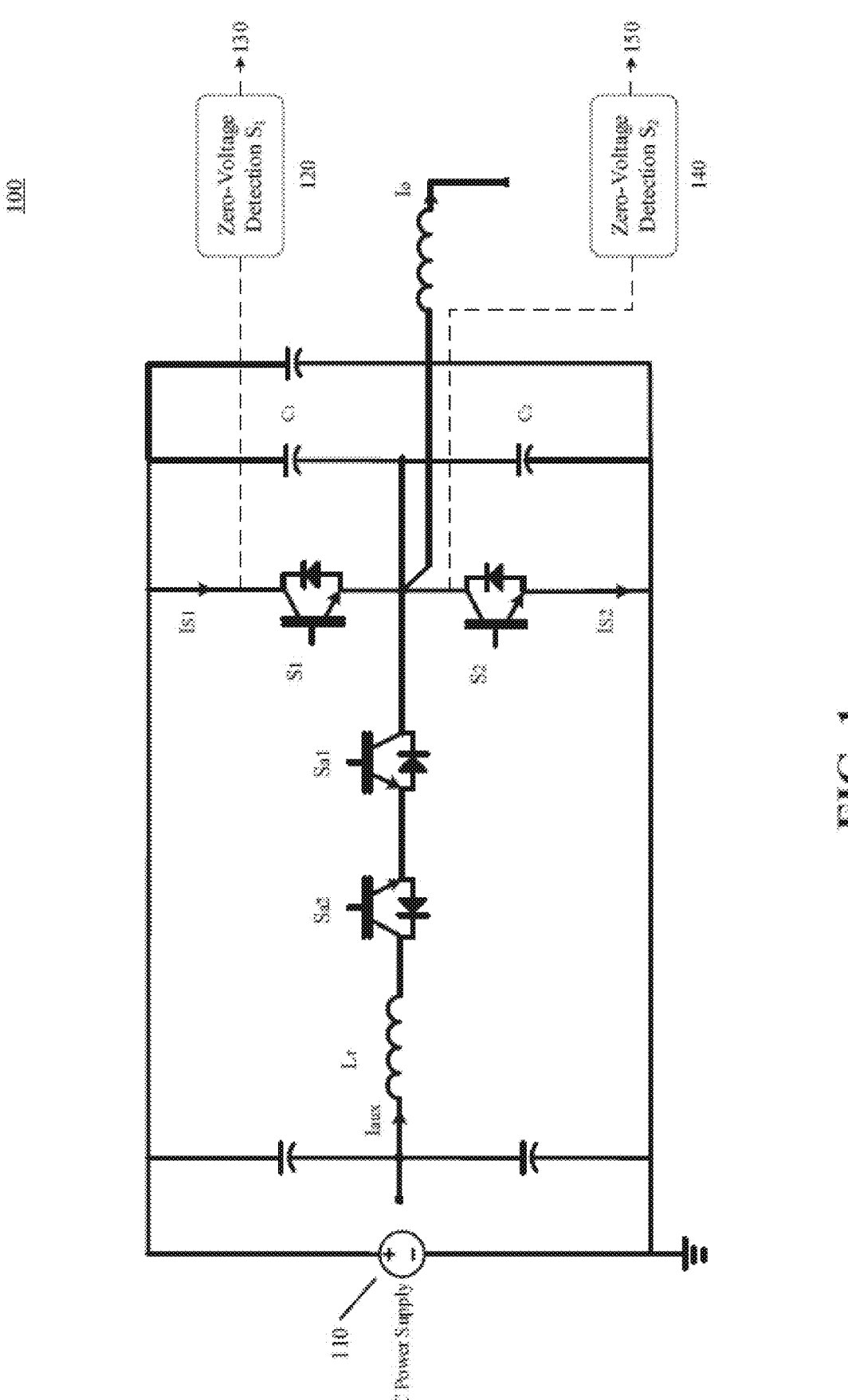
FIG. 1 is a schematic diagram of a one-phase auxiliary resonant commutated pole inverter (ARCPI) equivalent circuit according to an exemplary embodiment of the present disclosure.

FIG. 1 is a schematic diagram of a one-phase auxiliary resonant commutated pole inverter (ARCPI) equivalent circuit according to an exemplary embodiment of the present disclosure.

The circuit 100 includes a direct current (DC) charging power supply 110, for example, a DC bus voltage 110. The circuit 100 includes an auxiliary switch path that uses a resonant inductor $L_r$ with two insulated-gate bipolar transistors (IGBTs) $S_{a1}$ and $S_{a2}$ serving as auxiliary switches or auxiliary devices that form a bi-directional switch configuration. The current for the auxiliary switch path $I_{aux}$ goes through the resonant inductor $L_r$ and the two IGBTs $S_{a1}$ and $S_{a2}$. The resonant inductor $L_r$ forms an L-C resonant circuit, which ensures smooth voltage transition from the DC bus voltage 110 to zero.

The circuit 100 includes another two IGBTs $S_1$ and $S_2$ that serve as main switches. Each of the main switches $S_1$ and $S_2$ is arranged in parallel with a capacitor $C_1$ and $C_2$. The voltage across the main switch $S_1$ is fed to a zero-voltage detection circuit 120 for the main switch $S_1$. The zero-voltage detection circuit 120 detects zero voltages across the main switch $S_1$, at which point the main switch $S_1$ is turned on. Accordingly, the zero-voltage detection circuit 120 produces a detection signal 130 showing that a zero voltage across the main switch $S_1$ is detected.

Likewise, the voltage of the main switch $S_2$ will be fed to a zero-voltage detection circuit 140 for the main switch $S_2$. The zero-voltage detection circuit 140 detects zero voltages across the main switch $S_2$, and accordingly, produces a detection signal 150.

During each commutation event of the ARCPI, the two auxiliary devices ($S_{a1}$ and $S_{a2}$) and the L-C resonant circuit assist zero voltage switching (ZVS), for example, assist achieving ZVS within a certain time window. In general, the L-C resonant circuit current must reach a certain level, known as boosting current $I_{bst}$, before one of the main switches ($S_1$ or $S_2$) can be turned off. This boosting current $I_{bst}$ is controlled by a time interval, known as boosting time $T_{bst}$, during which one of the main switches ($S_1$ or $S_2$) and one of the auxiliary devices ($S_{a1}$ or $S_{a2}$) are both in an ON state.

In an exemplary embodiment of the present disclosure, the boosting time $T_{bst}$ is adjusted to control a timing when the voltage across one of main switches ($S_1$ or $S_2$) that is about to turn on reaches zero Volt. For example, the boosting time $T_{bst}$ is adjusted to guarantee a zero voltage across the main switch ($S_1$ or $S_2$) that is about to turn on within a maximal allowed time period. As such, this main switch ($S_1$ or $S_2$) can be turned on within the maximal allowed time period.

In an exemplary embodiment of the present disclosure, an optimal boosting current is searched by gradually incrementing the initial boosting current $I_{bst}$ determined by the boosting time $T_{bst}$. This search and the corresponding gradual increment continues until ZVS is achieved within a certain time window. For example, the initial boosting current $I_{bst}$ is adjusted to guarantee a zero voltage across the main switch ($S_1$ or $S_2$) that is about to turn on within a maximal allowed time period. As such, this main switch ($S_1$ or $S_2$) can be turned on within the maximal allowed time period.

Achieving ZVS significantly reduces switching losses of the main switches ($S_1$ and $S_2$) of the ARCPI. Further, achieving ZVS enables operations of the ARCPI at high switching frequencies with high efficiency. Through realizing a turn-on of the main switches ($S_1$ and $S_2$) with the lowest possible voltage during commutations of the ARCPI, extra losses and unnecessary oscillations are avoided.

Figure 2:
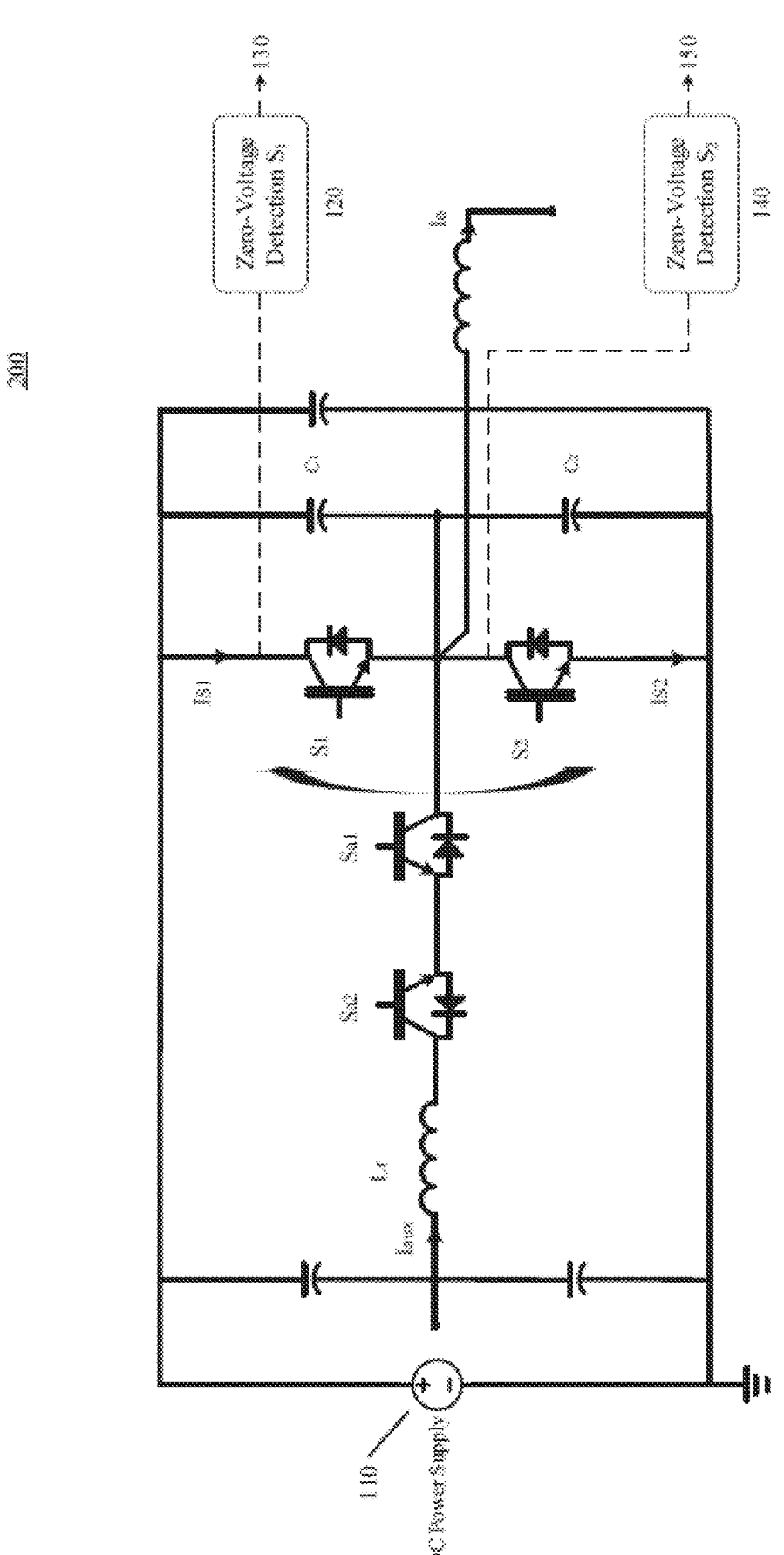
FIG. 2 is a schematic diagram of a bottom diode to top IGBT switching mode (Mode A) of a one-phase ARCPI equivalent circuit according to an exemplary embodiment of the present disclosure.

FIG. 2 is a schematic diagram of bottom diode to top IGBT switching mode (Mode A) of a one-phase ARCPI equivalent circuit according to an exemplary embodiment of the present disclosure.

In an exemplary embodiment of the present disclosure, the initial boosting current $I_{bst}$ is adjusted based on the detection signals 130 and 150 from the zero-voltage detection circuits 120 and 140 that detect zero voltage across the main switches ($S_1$ and $S_2$) of the ARCPI. For example, time interval measurements are made between the end of the boosting period and the time instance when zero voltage across the to-be-turned-on main switch ($S_1$ or $S_2$) is detected. The end of the boosting period is, for example, determined by a previously set boosting current, $I_{bsto}$.

If the measured time interval is less than a preprogrammed time window $T_{w2}$ plus a blanking time $T_{blk}$, it means ZVS is achieved, and it also means that the boosting current $I_{bst}$ and boosting time $T_{bst}$ are sufficient. If the measured time interval is larger than or equal to the preprogrammed time window $T_{w2}$ plus a blanking time $T_{blk}$, there are two possibilities. One is that ZVS occurs exactly at the end of the preprogrammed time window $T_{w2}$. In this situation, the boosting current $I_{bst}$ and boosting time $T_{bst}$ are sufficient. The other one is that ZVS does not occur, which means the main switch ($S_1$ or $S_2$) is turned on with inadequate voltage. In this situation, the boosting current $I_{bst}$ will be searched and gradually incremented until ZVS is achieved within the preprogrammed time window $T_{w2}$.

For example, Mode A as shown in FIG. 2 corresponds to the output current transitions from the bottom diode of main switch S2 to the complementary top IGBT of main switch S1. Similarly, Mode A corresponds to the output current transitions from the top diode of main switch S1 to the complementary bottom IGBT of main switch S2. In Mode A, the commutation event of the ARCPI includes that the bottom main switch $S_2$ is on and the top main switch $S_1$ is to be turned on with the assistance of the L-C resonant circuit. During this commutation event, the diode of the bottom main switch $S_2$ is to be turned off and the IGBT of the top main switch $S_1$ is to be turned on. The switching cycle starts when the auxiliary device $S_{a2}$ turns on for which a gate signal $G_{a2}$ is accordingly generated. At this point, a first time counter, Counter 1, starts counting time. The bottom main switch $S_2$ and the auxiliary device $S_{a2}$ remain in an ON state for the duration of the boosting time $T_{bst}$ of the L-C resonant circuit. The boosting time $T_{bst}$ is calculated according to the following formula:

$$T_{bst} = \frac{(I_o + I_{bst}) \cdot 2 \cdot L_r}{V_{DC}} \qquad (1)$$

where $V_{DC}$ represents the voltage, for example, the DC bus voltage 110 as shown, $L_r$ represents the resonance inductance of the resonant inductor $L_r$, $I_o$ represents the present output current at the moment of the current transition (or commutation), and $I_{bst}$ represents the boosting current corresponding to boosting time $T_{bst}$ of the auxiliary current in the auxiliary switch path.

When Counter 1 reaches the value of $T_{bst}$, the bottom main switch $S_2$ is turned off, and accordingly, a gate signal $G_2$ is generated. At the same time, a second time counter, Counter 2, is enabled. That is, both Counter 1 and Counter 2 count in parallel. Counter 2 keeps counting in parallel to Counter 1 until a detection signal 130 is received from the zero-voltage detection circuit 120 for the top main switch $S_1$. That means, a zero voltage is detected across the top main switch $S_1$ and the top main switch $S_1$ is being turned on. Accordingly, a gate signal $G_1$ is generated.

If the detection signal 130 is not received, that means no zero voltage is detected by the zero-voltage detection circuit 120 for the top main switch $S_1$. In that situation, the top main switch $S_1$ will be turned on once the preprogrammed time window $T_{w2}$ expires. Then, a decay to zero or a near zero voltage will be across the top main switch $S_1$ once it is turned on. The zero-voltage detection circuit 120 will detect this voltage, and accordingly, will produce the detection signal 130.

The detection signal 130 provides a positive or a rising edge, which latches the detection signal 130 at high-state, as shown in FIG. 3, and is used to trigger Counter 2 to stop counting. That is, Counter 2 counts a time interval (TZV) between the time when the L-C resonance starts and the time when the voltage across the top main switch $S_1$ reaches zero Volt. This timing measurement for ZVS of the ARCPI is shown in FIG. 4.

FIG. 3 includes schematic plots of relevant parameters during Mode A of a one-phase ARCPI equivalent circuit according to an exemplary embodiment of the present disclosure.

As shown in FIG. 3, PWM1 for the top main switch $S_1$ triggers a commutation event of the ARCPI. Accordingly, the diode of the bottom main switch $S_2$ is turning off and the IGBT of the top main switch $S_1$ is turning on. The switching cycle starts when the auxiliary device $S_{a2}$ turns on, and at this point, Counter 1 starts counting. As shown, the plot of the gate signal $G_{a2}$ for the auxiliary device $S_{a2}$ and the plot of Counter 1 show these described actions, respectively.

When Counter 1 reaches the value of boosting time ($T_{bst}$), the bottom main switch $S_2$ is turned off. Depending on an exact value of $T_{bst}$, this action is shown through the plot of the corresponding gate signal $G_2$ for the bottom main switch $S_2$ in FIG. 3. Also depending on an exact value of $T_{bst}$, the current across the bottom main switch $S_2$ may be $I_{S2}$ or $I_{S2}'$. As shown through the plot of $I_{S2}$ or $I_{S2}'$, the current across the bottom main switch $S_2$ changes according to the turning-off process of the bottom main switch $S_2$.

At this point, Counter 2 is triggered to count, and from this point, Counter 1 and Counter 2 count in parallel. Additionally and/or alternatively, Counter 1 may stop counting when Counter 2 starts counting. After the bottom main switch $S_2$ is turned off, the zero-voltage detection circuit 140 for the bottom main switch $S_2$ detects an increase of the voltage across the bottom main switch $S_2$, and accordingly, resets to low state the detection signal 150 for the voltage of the bottom main switch $S_2$. This action is shown through the plot designated as 150 in FIG. 3. Meanwhile, the voltage across the top main switch $S_1$ starts to decrease, as shown through the plot of $V_{130}$.

Counter 2 keeps counting in parallel to Counter 1 until the zero-voltage detection circuit 120 for the top main switch $S_1$ detects that the voltage across the top main switch $S_1$ reaches zero Volt. The plot designated as 130 represents the corresponding detection signal 130 produced by the zero-voltage detection circuit 120. The plot of $V_{130}'$ shows that the voltage across the top main switch $S_1$ decreases to zero Volt. Accordingly, the top main switch $S_1$ is being turned on, which is shown through the plot of the corresponding gate signal $G_1$.

As further shown in FIG. 3, the state of Counter 2 represents the time interval (TZV) between the time when the L-C resonance of the ARCPI starts until the time when the voltage across the top main switch $S_1$ reaches zero Volt. In an exemplary embodiment of the present disclosure, the time interval TZV is expected to be less than the preprogrammed time window $T_{w2}$ plus the programmed blanking time $T_{blk}$. An automated boosting current adjustment algorithm is expected to find the proper boosting current $I_{bst}$ and subsequent $T_{bst}$ for which the time TZV is less than $T_{blk}+T_{w2}$, in order to provide proper ZVS.

As also shown in FIG. 3, the gate signal $G_{a1}$ for the auxiliary device $S_{a1}$ remains flat (low state) during Mode A. It will show a similar plot as the gate signal $G_{a2}$ during Mode B, where the current is commutating from the IGBT to the diode of the main switch (either $S_1$-to-$S_2$ or $S_2$-to-$S_1$). For example, in Mode B, the IGBT of the bottom main switch $S_2$ is going to be turned OFF and the diode of the top main switch $S_1$ is going to be turned ON. The difference between Mode A and Mode B is the fact that in Mode A output current transitions from Diode to complementary IGBT and in Mode B the current transitions from IGBT to complementary Diode.

FIG. 4 is a schematic diagram of zero voltage switching (ZVS) timing measurement process for a one-phase ARCPI equivalent circuit according to an exemplary embodiment of the present disclosure.

As shown in FIG. 4, a PWM 402 (PWM1 for the top main switch $S_1$ and PWM2 for the bottom main switch $S_2$ as shown in FIG. 3) will be provided to a rising edge detector 404. A positive edge of the PWM 402 will be detected at 404 and latched at 406, and then, used to enable the counter 408 (Counter 1). While the counter 408 is counting, it also compares with the boosting time $T_{bst}$ at 412 that is calculated based on the boosting current $I_{bst}$ and output current $I_o$ (the output current $I_o$ could be zero) according to Equation (1) at 410. If the time counted by the counter 408 is the same as the boosting time $T_{bst}$, it is latched at 414 and used to enable the counter 422 (Counter 2). From this point, both counter 408 and counter 422 are counting.

For example, the counter 422 continues counting until a positive edge of the detection signal 130 of the zero-voltage detection circuit 120 or of the detection signal 150 of the zero-voltage detection circuit 140 provided at 416 is detected by the rising edge detector 418. The detection signal 130 or 150 will be then latched at 420 and used to stop the counter 422. The TZV 424 counted by the counter 422 represents the time between the L-C resonance starts and the voltage across the main switch ($S_1$ or $S_2$) reaches zero Volt.

Referring back to FIG. 2, the TZV counted by Counter 2 (the counter 422) is then compared to the preprogrammed time window $T_{w2}+T_{blk}$. If TZV is less than the preprogrammed time window $T_{w2}+T_{blk}$, it means, the zero-voltage switching of the top main switch $S_1$ occurs before the preprogrammed time window $T_{w2}$ expires. That is, the top main switch $S_1$ is indeed switched in ZVS mode. This also means, the boosting current $I_{bst}$ is sufficient for ZVS operation. Accordingly, the boosting time $T_{bst}$ is sufficient for ZVS operation as well. In this situation, the existing boosting current $I_{bst}$ is properly set.

If the TZV is larger than or equal to a sum of the preprogrammed time window $T_{w2}+T_{blk}$, ZVS operation may not be guaranteed. The blanking time $T_{blk}$ is a preset value used to prevent false detection of the zero-voltage instant. It will take some time for the voltage to transition from Vdc to zero volt. This time will depend on the design L-C resonant circuit parameters and present load current. Therefore, there is a minimum time where the zero-voltage instant is not expected. This minimum time is the value with which the blanking time $T_{blk}$ is preset. It is estimated that this time is in the order of 100 ns to 500 ns. On the other hand, the time window $T_{w2}$ is set to make sure the voltage transition time is no longer than the value proposed by the designer's objectives of limited dV/dt. As example, this value can range from 200 ns to 2000 ns.

In one possibility, the detection signal 130 of the zero-voltage detection circuit 120 for the top main switch $S_1$ could come exactly at the end of the preprogrammed time window $T_{w2}$. To verify this, the preprogrammed time window $T_{w2}$ is incremented. For example, the preprogrammed time window $T_{w2}$ is incremented by a small value $\Delta t$ each time if it is less than a maximal preprogrammed time window $T_{w2max}$, and then the entire process repeats. The entire process repeats until the TZV is less than the sum of the preprogrammed time window $T_{w2}$ and the blanking time $T_{blk}$.

Once the $T_{w2}$ reached the $T_{w2max}$, it is certain that the top main switch $S_1$ is not switched in ZVS mode, and the boosting current $I_{bst}$ is insufficient. The boosting current $I_{bst}$ will be incremented by a small value $\Delta I_{bst}$ each time if it is less than a maximal allowed boosting current $I_{bst\_max}$, and then the entire process repeats. The entire process repeats until the TZV is less than the sum of the preprogrammed time window $T_{w2}$ and the blanking time $T_{blk}$. In this situation, it means, the top main switch $S_1$ is switched in ZVS mode. The process is shown in FIG. 5 and FIG. 6 in a flowchart format.

As such, the process for adjusting the boosting current for bottom to top device switching mode (Mode A) of a one-phase ARCPI equivalent circuit is completed. A similar process, as shown in FIGS. 4-6, is adopted for IGBT (top in the example) to Diode (bottom in the example) switching mode (Mode B) of a one-phase ARCPI equivalent circuit.

FIG. 5 is a schematic flowchart of automatic boosting current adjustment process for a one-phase ARCPI equivalent circuit according to an exemplary embodiment of the present disclosure.

As shown, a process or a method 500 of adjusting the boosting current of the ARCPI includes the following steps:

At 502, a device provides an input to trigger a first counter.

The device generally incudes one or more processors that execute a process or a method 500 of adjusting the boosting current of the ARCPI. The device is described in details with reference to FIG. 7.

The input is a PWM for a PWM ARCPI. Additionally and/or alternatively, other types of inputs may also be used to trigger the first counter.

The first counter may be Counter 1 described according to FIG. 2 and the counter 408 described according to FIG. 4. Once triggered, the first counter starts to count.

At 504, while the first counter is counting, the device compares the time counted by the first counter and the boosting time $T_{bst}$ of the ARCPI.

The boosting time of the ARCPI ($T_{bst}$) is calculated based on the boosting current ($I_{bst}$) according to Equation (1) described with reference to FIG. 2.

If the time counted by the first counter does not reach the boosting time $T_{bst}$ of the ARCPI, the first counter continues counting, as shown at 505. If the time counted by the first counter reaches the boosting time $T_{bst}$ of the ARCPI, a second counter is triggered to count.

At 506, the device triggers the second counter once it determines that the time counted by the first counter reaches the boosting time $T_{bst}$ of the ARCPI.

Once triggered, the second counter counts in parallel to the first counter (It can also stop at this moment).

The second counter may be Counter 2 described according to FIG. 2 and the counter 422 described according to FIG. 4. Additionally and/or alternatively, the second counter may be the same as the first counter, or different from the first counter.

At 508, while the second counter is counting, the device determines whether a detection signal is received.

The detection signal is generated by the zero-voltage detection circuit 120 for the top main switch $S_1$, or the detection signal is generated by the zero-voltage detection circuit 140 for the bottom main switch $S_2$, as shown in FIGS. 1 and 2. The detection signal indicates whether a zero voltage across the top main switch $S_1$ or the bottom main switch $S_2$ of the ARCPI.

If the detection signal is not received, the second counter continues counting, as shown at 509. If the detection signal is received, the second counter is stopped.

At 510, the device stops the second counter once it determines that the detection signal is received. Accordingly, the device obtains a time interval (TZV) indicating the time counted by the second counter.

The timing measurement completed by steps 502, 504, 505, 506, 508, 509, and 510 is also described with reference with FIG. 4.

At 512, the device determines whether TZV is larger than or equal to a sum of a preprogrammed time window $T_{w2}$ and a blanking time $T_{blk}$.

If TZV is less than the sum of the preprogrammed time window $T_{w2}$ and the blanking time $T_{blk}$, it means, a ZVS mode is achieved, and the boosting current ($I_{bst}$) and boosting time ($T_{bst}$) are sufficient as well. Accordingly, the device understands and may also indicate that the boosting current ($I_{bst}$) is set, as shown at 514. The device ends the process/method 500.

If TZV is larger than or equal to the sum of the preprogrammed time window $T_{w2}$ and the blanking time $T_{blk}$, the process/method 500 further includes the following steps:

At 516, the device determines whether the preprogrammed time window $T_{w2}$ reaches a maximal time window $T_{w2max}$.

At 518, the device increments the preprogrammed time window $T_{w2}$ by a time value, if the device determines that the preprogrammed time window $T_{w2}$ does not reach the maximal time window $T_{w2max}$. The time value may be $\Delta t$.

Then, the device verifies that the time TZV is always higher or equal than $T_{w2}+T_{blk}$ for the given $I_{bst}$ even for the maximum allowed value for $T_{w2}=T_{w2max}$ (confirming that the $I_{bst}$ is not high enough to ensure ZVS) by repeating the steps 502, 504, 505, 506, 508, 509, 510, 512, 516, and 518.

At 520, if the device determines that the preprogrammed time window $T_{w2}$ reaches the maximal time window $T_{w2max}$, the device first determines whether the boosting current $I_{bst}$ is less than a maximal boosting current $I_{bst\_max}$.

At 522, if the boosting current $I_{bst}$ is less than the maximal boosting current $I_{bst\_max}$, the device increments the boosting current $I_{bst}$ by a boosting current value $\Delta I_{bst}$. The boosting current value $\Delta I_{bst}$ may be in accordance to the model of ARCPI, additionally and/or alternatively, the boosting current value $\Delta I_{bst}$ may also be other values.

Then, the device adjusts the boosting current $I_{bst}$ by repeating the steps 502, 504, 505, 506, 508, 509, 510, 512, 516, 520, and 522 until TZV is less than the sum of the preprogrammed time window $T_{w2}$ and the blanking time $T_{blk}$.

If the boosting current $I_{bst}$ is larger than the maximal boosting current $I_{bst\_max}$, the device failed to find the adequate $I_{bst}$ to ensure ZVS.

As such, the process/method 500 of adjusting the boosting current of the ARCPI is completed. The boosting current is controlled to a sufficient level to ensure proper ZVS operations. Accordingly, switching loss caused by switches between the main switches $S_1$ and $S_2$ of the ARCPI is reduced.

FIG. 6 is a schematic flowchart of automatic boosting current adjustment process for a one-phase ARCPI equivalent circuit according to an exemplary embodiment of the present disclosure.

A process or a method 600 of adjusting the boosting current of the ARCPI is conducted before the process 500, as shown in FIG. 5. The process 600 includes the following steps:

At step 602, the device receives parameters that are necessary for adjusting the boosting current of the ARCPI. These parameters include (1) the previously set boosting current ($I_{bsto}$) for Equation (1); (2) the boosting current value $\Delta I_{bst}$, by which the boosting current $I_{bst}$ will be incremented if it does not reach the maximal boosting current $I_{bst\_max}$; (3) the preprogrammed time window $T_{w2}$; (4) the time value $\Delta t$, by which the preprogrammed time window $T_{w2}$ will be incremented if it does not reach the maximal time window $T_{w2max}$; the maximum value for $T_{w2max}$ and (5) the blanking time $T_{blk}$.

At step 604, the device receives the present value of the output current IL. A current sensor is necessary to obtain this value.

At step 606, the device determines whether the ARCPI is in Mode A or Mode B based on the present output current $I_o$.

At step 608, if the device determines that the ARCPI is not in Mode A, i.e., the ARCPI is in Mode B, the device sets the output current $I_o$ that is received at step 604 to zero.

At step 610, the device sets the boosting current to a sum of the resulting current $I_o$ and the initial value of the boosting current $I_{bsto}$ set on 602.

As such, the parameters are available for calculating the boosting time $T_{bst}$ according to Equation (1), and further, for adjusting the boosting current to achieve ZVS operations.

FIG. 7 is a schematic diagram of a device for automatically adjusting a boosting current of a one-phase ARCPI equivalent circuit according to an exemplary embodiment of the present disclosure.

As shown in FIG. 7, the device 700 for automatically adjusting boosting current of the ARCPI may include a bus 706, a processor 702, a communication interface 704 and a memory 708. Additionally and/or alternatively, the device 700 may further include a display 710. For example, the processor 702, the communication interface 704, the memory 708 and the display 710 may communicate with each other through the bus 706.

The processor 702 may include one or more general-purpose processors, such as a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 708 may include a volatile memory, for example, a random access memory (RAM). The memory 708 may further include a non-volatile memory (NVM), for example, a read-only memory (ROM), a flash memory, a hard disk drive (HDD), or a solid-state drive (SSD). The memory 708 may further include a combination of the foregoing types.

The memory 708 may have computer-readable program codes stored thereon. The processor 702 may read the computer-readable program codes stored on the memory 708 to implement the method 500 shown in FIG. 5 and the method 600 shown in FIG. 6 described above to adjust the boosting current in the auxiliary switch path of the ARCPI shown in FIGS. 1 and 2. Additionally and/or alternatively, the processor 702 may read the computer-readable program codes stored on the memory 708 to implement one or more other functions, or a combination of these functions.

The processor 702 may further communicate with another computing device through the communication interface 704. For example, the processor 702 may communicate with another computing device to receive the PWM input to start a commutation event of the ARCPI. For example, the processor 702 may communicate with another computing device to receive the two time parameters ($T_{w2}$ and $T_{blk}$) for evaluating the time counted by Counter 2 so as to adjust the boosting current of the ARCPI. For example, the processor 702 may communicate with another computing device to receive the previously set boosting current $I_{bsto}$ and the first boosting current $I_o$ for calculating the boosting time $T_{bst}$ according to Equation (1), and also, the boosting current value $\Delta I_{bst}$ for adjusting the boosting current. For example, the processor 702 may further communicate with another computing device to receive the time value $\Delta t$ for adjusting the preprogrammed time window $T_{w2}$.

The processor 702 may further trigger the display 710 to display information to a user. For example, the processor 702 may trigger the display 710 to display each value of the boosting current that is adjusted through each repeat of the method 500 as shown in FIG. 5. For example, the processor 702 may trigger the display 710 to display that the time parameter $T_{w2}$ expires and the main switch ($S_1$ or $S_2$ as shown in FIGS. 1 and 2) is going to be forced to turn on, and accordingly, a detection signal (130 or 150 as shown in FIGS. 1 and 2) is generated. For example, the processor 702 may trigger the display 710 to display the plots shown in FIG. 3.

A person of ordinary skill in the art will appreciate that the device 700 as shown in FIG. 7 may communicate with one or more further computing devices through the communication interface 704 or wireless connections for further functions, or a combination of functions. The device 700 may also include one or more further functional components to perform and/or trigger further functions, or a combination of functions.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of the present disclosure are described herein, including the best mode known to the inventors for carrying out the disclosure. Variations of those exemplary embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for adjusting a boosting current of an auxiliary resonant commutated pole inverter (ARCPI), comprising:
   (1) providing an input to trigger a first counter;
   (2) triggering a second counter based on determining that the first counter reaches a boosting time of the ARCPI;
   (3) stopping the second counter based on determining that a detection signal is received, and obtaining a time interval counted by the second counter; and
   (4) adjusting the boosting current based on determining that the time interval is equal to a sum of a first time and a blanking time.

2. The method of claim 1, wherein the adjusting the boosting current comprises:
   increasing the first time by a first time value and repeating the steps (1)-(4) until the time interval is less than the sum of the first time and the blanking time based on determining that the first time is less than a maximal time;
   determining whether the boosting current is less than a maximal boosting current based on determining that the first time is larger than or equal to the maximal time; and
   increasing the boosting current by a boosting current value and repeating the steps (1)-(4) until the time interval is less than the sum of the first time and the blanking time in response to the boosting current being less than the maximal boosting current.

3. The method of claim 2, further comprising:
   indicating "search failure" in response to the boosting current being larger than or equal to the maximal boosting current.

4. The method of claim 1, further comprising:
   indicating the boosting current is set based on determining that the time interval is less than the sum of the first time and the blanking time.

5. The method of claim 1, wherein the boosting time is calculated as follows:

$$T_{bst} = \frac{(I_o + I_{bst}) \cdot 2 \cdot L_r}{V_{DC}}$$

where $V_{DC}$ represents a direct current (DC) bus voltage, $L_r$ represents resonance inductance of a resonant inductor of the ARCPI, $I_o$ represents a present output current at a commutation moment of the ARCPI, and $I_{bst}$ represents the boosting current corresponding to the boosting time of the ARCPI.

6. The method of claim 1, wherein the detection signal is determined through a detection circuit for a main switch of the ARCPI.

7. The method of claim 1, wherein the input is a pulse width modulation (PWM).

8. The method of claim 1, wherein the first counter is the same as the second counter, or the first counter is different from the second counter.

9. A control circuit for adjusting a boosting current of an auxiliary resonant commutated pole inverter (ARCPI), comprising one or more processors configured to:
   (1) provide an input to trigger a first counter;
   (2) trigger a second counter based on determining that the first counter reaches a boosting time of the ARCPI;
   (3) stop the second counter based on determining that a detection signal is received, and obtaining a time interval counted by the second counter; and
   (4) adjust the boosting current based on determining that the time interval is equal to a sum of a first time and a blanking time.

10. The control circuit of claim 9, wherein the one or more processors are further configured to:
   increase the first time by a first time value and repeating the steps (1)-(4) until the time interval is less than the sum of the first time and the blanking time based on determining that the first time is less than a maximal time;
   determine whether the boosting current is less than a maximal boosting current based on determining that the first time is larger than or equal to the maximal time; and
   increase the boosting current by a boosting current value and repeating the steps (1)-(4) until the time interval is less than the sum of the first time and the blanking time in response to the boosting current being less than the maximal boosting current.

11. The control circuit of claim 10, wherein the one or more processors are further configured to:
   indicate "search failure" in response to the boosting current being larger than or equal to the maximal boosting current.

12. The control circuit of claim 9, wherein the one or more processors are further configured to:
   indicate the boosting current is set based on determining that the time interval is less than the sum of the first time and the blanking time.

13. The control circuit of claim 9, wherein the boosting time is calculated as follows:

$$T_{bst} = \frac{(I_o + I_{bst}) \cdot 2 \cdot L_r}{V_{DC}}$$

where $V_{DC}$ represents a direct current (DC) bus voltage, $L_r$ represents resonance inductance of a resonant inductor of the ARCPI, $I_o$ represents a present output current at a commutation moment of the ARCPI, and $I_{bst}$ represents the boosting current corresponding to the boosting time of the ARCPI.

14. The control circuit of claim 9, wherein the detection signal is determined through a detection circuit for a main switch of the ARCPI.

15. The control circuit of claim 9, wherein the input is a pulse width modulation (PWM).

16. The control circuit of claim 9, wherein the first counter is the same as the second counter, or the first counter is different from the second counter.

17. A non-transitory computer-readable medium, having computer-executable instructions stored thereon, the computer-executable instructions, when executed by one or more processors of a control circuit for adjusting a boosting current of an auxiliary device of an auxiliary resonant commutated pole inverter (ARCPI), cause the control circuit to facilitate:

(1) providing an input to trigger a first counter;

(2) triggering a second counter based on determining that the first counter reaches a boosting time of the ARCPI;

(3) stopping the second counter based on determining that a detection signal is received, and obtaining a time interval counted by the second counter; and adjusting the boosting current based on determining that the time interval is equal to a sum of a first time and a blanking time.

18. The non-transitory computer-readable medium of claim 17, wherein the control circuit is further caused to:

increase the first time by a first time value and repeating the steps (1)-(4) until the time interval is less than the sum of the first time and the blanking time based on determining that the first time is less than a maximal time;

determine whether the boosting current is less than a maximal boosting current based on determining that the first time is larger than or equal to the maximal time; and increase the boosting current by a boosting current value and repeating the steps (1)-(4) until the time interval is less than the sum of the first time and the blanking time in response to the boosting current being less than the maximal boosting current.

19. The non-transitory computer-readable medium of claim 18, wherein the control circuit is further caused to:

indicate "search failure" in response to the boosting current being larger than or equal to the maximal boosting current.

20. The non-transitory computer-readable medium of claim 17, wherein the control circuit is further caused to:

indicate the boosting current is set based on determining that the time interval is less than the sum of the first time and the blanking time.

* * * * *